United States Patent
Kuehnle

(10) Patent No.: US 10,147,172 B2
(45) Date of Patent: Dec. 4, 2018

(54) LEARNING THE DISTANCE BETWEEN CAMERAS FOR ARTICULATED VEHICLES

(71) Applicant: Bendix Commercial Vehicle Systems LLC, Elyria, OH (US)

(72) Inventor: Andreas U. Kuehnle, Villa Park, CA (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 0 days.

(21) Appl. No.: 15/801,739

(22) Filed: Nov. 2, 2017

(65) Prior Publication Data
US 2018/0144454 A1 May 24, 2018

Related U.S. Application Data

(62) Division of application No. 14/458,300, filed on Aug. 13, 2014, now abandoned.

(51) Int. Cl.
*G06T 5/50* (2006.01)
*G06T 7/80* (2017.01)

(52) U.S. Cl.
CPC ............ *G06T 5/50* (2013.01); *G06T 7/80* (2017.01); *G06T 2207/10016* (2013.01); *G06T 2207/30252* (2013.01)

(58) Field of Classification Search
CPC ...................................................... G06T 7/80
See application file for complete search history.

(56) References Cited

U.S. PATENT DOCUMENTS

| | | |
|---|---|---|
| 6,923,080 B1 | 8/2005 | Dobler et al. |
| 6,930,593 B2 | 8/2005 | Crawshaw |
| 7,904,222 B2 | 3/2011 | Lee et al. |
| 8,462,988 B2 | 6/2013 | Boon |
| 2008/0231701 A1 | 9/2008 | Greenwood et al. |
| 2010/0079590 A1 | 4/2010 | Kuehnle et al. |
| 2010/0171828 A1 | 7/2010 | Ishii |
| 2011/0001825 A1 | 1/2011 | Hahn |
| 2012/0033078 A1 | 2/2012 | Huang |
| 2014/0043473 A1 | 2/2014 | Gupta et al. |
| 2014/0078302 A1 | 3/2014 | Hamdan et al. |
| 2014/0085472 A1 | 3/2014 | Lu et al. |

FOREIGN PATENT DOCUMENTS

WO 2013/032371 A1 3/2013

OTHER PUBLICATIONS

International Search Report and Written Opinion of corresponding International Application No. PCT/US2015/040827, dated Oct. 23, 2015, 12 pages.
Santoro et al., "Misalignment Correction for Depth Estimation Using Stereoscopic 3-D Cameras," 2012 IEEE 14th International Workshop on Multimedia Signal Processing (MMSP), Sep. 17, 2012, pp. 19-24.

*Primary Examiner* — Y Lee
(74) *Attorney, Agent, or Firm* — Fay Sharpe LLP

(57) ABSTRACT

When calculating true inter-camera distance, offset images of a reference object such as a lane marker from at least two cameras coupled to an articulating vehicle are overlaid and shifted until the reference objects in each image are aligned. The distance by which the reference object images are shifted, as well as any rotation required to align the images, is used to calculate the actual distance between the cameras and to compensate for average yaw angle between the cameras when positioning the images for digital stitching to generate a composite "surround view" image.

13 Claims, 7 Drawing Sheets

LEARNING THE DISTANCE BETWEEN CAMERAS FOR ARTICULATED VEHICLES

This application is a divisional of U.S. patent application Ser. No. 14/458,300, filed Aug. 13, 2014, the subject matter of which is hereby incorporated herein by reference in its entirety.

BACKGROUND

The present application finds particular application in panoramic vehicle imaging systems. However, it will be appreciated that the described techniques may also find application in other vehicle monitoring systems, other imaging systems, or other vehicle safety systems.

Articulated vehicles often consist of two or more freely linkable sections, which may be exchanged for other similar sections. If a surround view camera system is attached to these linkable sections, then the distance and yaw angle between the cameras on the tractor and the cameras on the trailer(s) may vary. Conventional systems do not calculate true inter-camera distance to account for these variations, and do not account for camera yaw angle, when reconstructing the surround view image.

The present innovation provides new and improved systems and methods that facilitate calculating a true inter-camera distance and accounting for yaw angle between cameras when generating a composite surround view image for an articulating vehicle, which overcome the above-referenced problems and others.

SUMMARY

In accordance with one aspect, a system that facilitates determine a true inter-camera distance (TICD) between cameras mounted on separate portions of an articulated vehicle, comprises, a first camera, a second camera, and a processor configured to receive from the first camera a first image frame comprising a first image of a reference object, and to receive from the second camera a second image frame comprising a second image of the reference object, which is offset from the first image. The processor is further configured to overlay the first and second images thereby generating a composite image of the reference object, shift the first and second images until they are aligned, and calculate the TICD between the first and second cameras as a function of the distances by which first and second images are shifted during alignment. The TICD may be calculated in both directions, longitudinally and laterally. That is, shifting may be performed in both directions.

In accordance with another aspect, a method of calculating a true inter-camera distance (TICD) between cameras mounted on separate portions of an articulated vehicle, comprises receiving from a first camera a first image frame comprising a first image of a reference object receiving from a second camera a second image frame comprising a second image of the reference object, which is offset from the first image, and overlaying the first and second images thereby generating a composite image of the reference object. The method further comprises shifting the first and second images until they are aligned, and calculating the TICD between the first and second cameras as a function of the distances by which first and second images are shifted during alignment.

In accordance with another aspect, a processor is configured to execute computer-executable instructions for calculating a true inter-camera distance (TICD) between cameras mounted on separate portions of an articulated vehicle, the instructions comprising, receiving from a first camera a first image frame comprising a first image of a reference object, receiving from a second camera a second image frame comprising a second image of the reference object, which is offset from the first image, and overlaying the first and second images thereby generating a composite image of the reference object. The instructions further comprise shifting the first and second images until they are aligned, and calculating the TICD between the first and second cameras as a function of the distances by which first and second images are shifted during alignment.

In accordance with another aspect, an apparatus that facilitates calculating a true inter-camera distance (TICD) between cameras mounted on separate portions of an articulated vehicle comprises means for capturing a plurality of images of a reference object from at least two perspective points, means for receiving from a first camera a first image frame comprising a first image of a reference object, and means for receiving from a second camera a second image frame comprising a second image of the reference object, which is offset from the first image. The apparatus further comprises means for overlaying the first and second images thereby generating a composite image of the reference object, means for shifting the first and second images until they are aligned, and means for calculating the TICD between the first and second cameras as a function of the distances by which first and second images are shifted during alignment.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which facilitate determining a distance between cameras mounted on an articulated vehicle, in order to refine a surround view reconstructed from the individual camera views. For instance, the surround view can be generated from multiple cameras mounted on the articulated vehicle with properly-connected image stitching regardless of the particular orientation and/or separation of the cameras.

Figure 1:
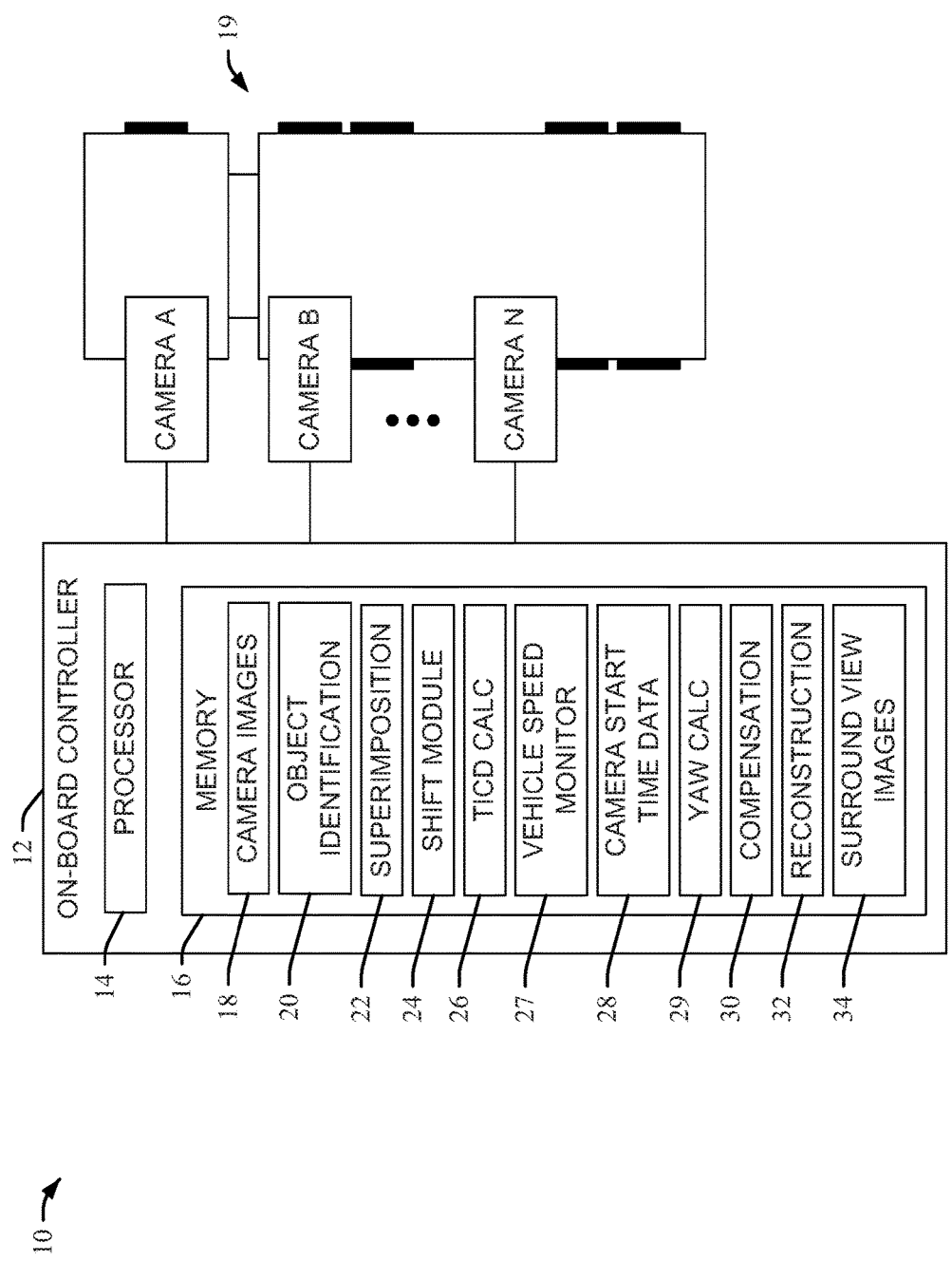
FIG. 1 illustrates a system that facilitates calculating a true inter-camera distance (TICD) between multiple cameras mounted to an articulating vehicle, calculating camera yaw angles, and compensating for camera yaw when reconstructing a composite surround view image using the TICD, in accordance with one or more aspects described herein.

FIG. 1 illustrates a system 10 that facilitates calculating a true inter-camera distance (TICD) between multiple cameras mounted to an articulating vehicle, calculating camera yaw angles, and compensating for camera yaw when reconstructing a composite surround view image using the TICD, in accordance with one or more aspects described herein. The system thus determines distances between cameras mounted on an articulating vehicle (e.g., a tractor-trailer or the like) and uses the determined inter-camera distances to generate a composite surround view image of the vehicle. Additionally, the system calculates and compensates for camera yaw angle, which may be different across multiple cameras.

The system 10 includes an onboard controller 12 comprising a processor 14 that executes, and a memory 14 that stores, computer-executable instructions (e.g., modules, routines, programs, applications, etc.) for performing the various methods, techniques protocols, etc., described herein. In contrast to conventional approaches, the system 10 facilitates compensating for camera yaw and calculating a precise inter-camera distance in real time, which has the advantage of mitigating distance calculation error that can arise when sections of the articulating vehicle are interchanged.

The memory 16 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 14. Additionally, "module," as used herein denotes a set of computer-executable instructions (e.g., a routine, sub-routine, program, application, or the like) that is persistently stored on the computer-readable medium or memory for execution by the processor.

In one embodiment, the processor calculates true inter-camera distances between all cameras used to generate the composite surround view image. For instance, camera images 18 are received from a plurality of cameras A, B, . . . , N (where N is an integer) mounted to the articulating vehicle 19 and stored in the memory 16. The processor executes an object identification module 20 that identifies a reference object (e.g., a lane marker or painted stripe on a road) in the received images. The processor executes an image superimposition module 22 that overlays, e.g., an image from camera A onto an image from camera B. It will be noted that the image frames captured by cameras A and B are slightly offset from each other, regardless of whether the cameras capture images synchronously or asynchronously as the vehicle moves. Therefore, the processor executes a shift module 24 that shifts one or both of the offset images until the reference object is aligned in both images. The distance of the shift is used by the processor, in conjunction with a priori knowledge of the length of the reference object or calculated reference object length, when executing a TICD module 26 to determine the true inter-camera distance between the cameras. In one embodiment, the one reference object image is subtracted from the other to determine the shift distance. In another embodiment, a matched filter technique is employed to determine the shift distance.

The processor executes a vehicle speed monitor module 27 that monitors vehicle speed. The TICD module 26 evaluates start time data 28 for each camera being analyzed, in conjunction with the vehicle speed information to determine a distance uncertainty value (DUFM) that is indicative of distance uncertainty due to camera motion. An inter-camera frame start time difference (DFST) is determined by the TICD module, and is used to identify the amount of shift applied to align the overlaid images. This amount of shift in turn is used to determine the true inter-camera distance.

Additionally, the processor executes a yaw calculation module 29 that determines a yaw angle between the cameras. Camera yaw angle is determined as a function of the amount of rotation or "twisting" required to align the reference object in one camera image with another. The determined yaw values for each camera are averaged by the yaw calculation module over multiple image frames and over time in order to determine an average yaw value that can be regularly applied for each camera when reconstructing the composite surround view. For example, camera B may have an average yaw of 0.4 degrees relative to the vehicle centerline or relative to a 'root' camera that the other cameras reference to, and so image frames received from camera B can be twisted or otherwise adjusted by 0.4 degrees when generating the composite surround view image. In this embodiment, the camera yaw angle for respective cameras can be calculated periodically or initially upon coupling a new trailer to a tractor. A compensation module 30 applies yaw angle adjustments as well as adjusts images from each camera for stitching together by a reconstruction module 32, which generates the composite surround view image(s) 34.

With continued reference to FIG. 1, FIGS. 2A-2D shows an example of two cameras, camera A and camera B, viewing a rectangular pattern on the ground and producing a stitched image from the two camera images, using an assumed inter-camera distance, in accordance with one or more features described herein.

Figure 2A:
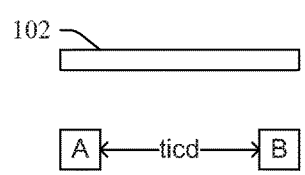
FIG. 2A illustrates a first camera A, and a second camera B, which can be mounted on respective segments of an articulating vehicle, such as a tractor-trailer.
Figure 2B:
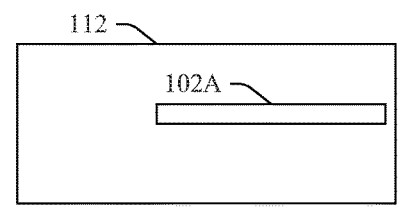
FIG. 2B shows a top-view image of a dashed line as seen by camera A.
Figure 2C:
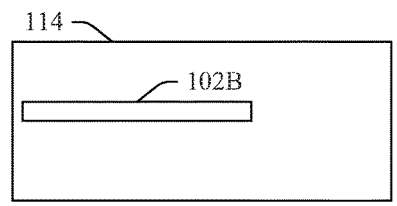
FIG. 2C shows a top-view image of a dashed line as seen by camera B.
Figure 2D:
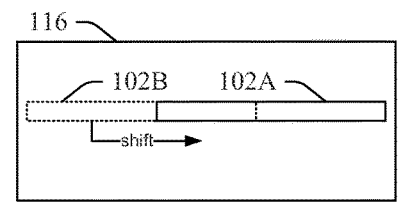
FIG. 2D shows a composite image in which the first image and the second image are superimposed on each other.

FIG. 2A illustrates a first camera A, and a second camera B, which can be mounted on respective segments of an articulating vehicle, such as a tractor-trailer. A true inter-camera distance (TICD) is determined by capturing images of a reference object 102, such as a dashed line on a highway, such as are used to mark traffic lanes. FIG. 2B shows a top-view image 112 of a dashed line 102A as seen by camera A. FIG. 2C shows a top-view image 114 of the same dashed line 102B as seen by camera B. FIG. 2D shows a composite image 116 in which the image 102A and the image 102B are superimposed on each other. One of the reference object images (102B in the illustrated example) is shifted until it is aligned with the other reference object image (102A in this example). Using a priori knowledge of the length of the reference object, the distance (e.g., in pixels) by which the reference marker image 102B is shifted can be used to determine the true inter camera distance. In another embodiment, both images of the reference object are shifted toward each other to align the reference object images in order to calculate the TICD. It will be appreciated that although the examples of FIGS. 2A-2D show a reference object shifted in the x-direction for illustrative purposes, the reference object can also be shifted in the y-direction and/or rotated as needed to align the images, as will be apparent to those of skill in the art.

According to an example, a composite surround view generated from multiple camera views is adjusted using a known length of one or more reference objects. In the illustrated example, the inter-camera distance varies longitudinally only. However, it will be appreciated that the inter-camera distance may vary vertically (e.g., the cameras may be mounted at different heights) and/or laterally (e.g., different width trailers have different lateral offsets), and that such variation may be compensated for in a manner similar to that described with regard to horizontal variation, as will be understood by those of skill in the art. The length of the reference object can be known in advance (e.g., using knowledge of standard highway lane marker lengths: e.g., 2 m long lines spaced 3 m apart or some other known pattern) or determined in advance or in real time (e.g., by positioning a portion of the articulated vehicle having a known size or length within the field of view of each camera and calculating the length of the reference object by comparison to the vehicle portion in the field of view with the reference object). In another example, a portion of the vehicle within each camera's field of view, and at a known distance from the camera, is marked with a set of reference lines representing inches, centimeters, or the like, and the reference markings are compared to the reference object in the field of view of the camera to determine the length of the reference object. Once the length of the reference object is known, a parameter describing the inter-camera distance may then be adjusted so that the length of the pattern in the stitched image matches the known value.

Figure 3:
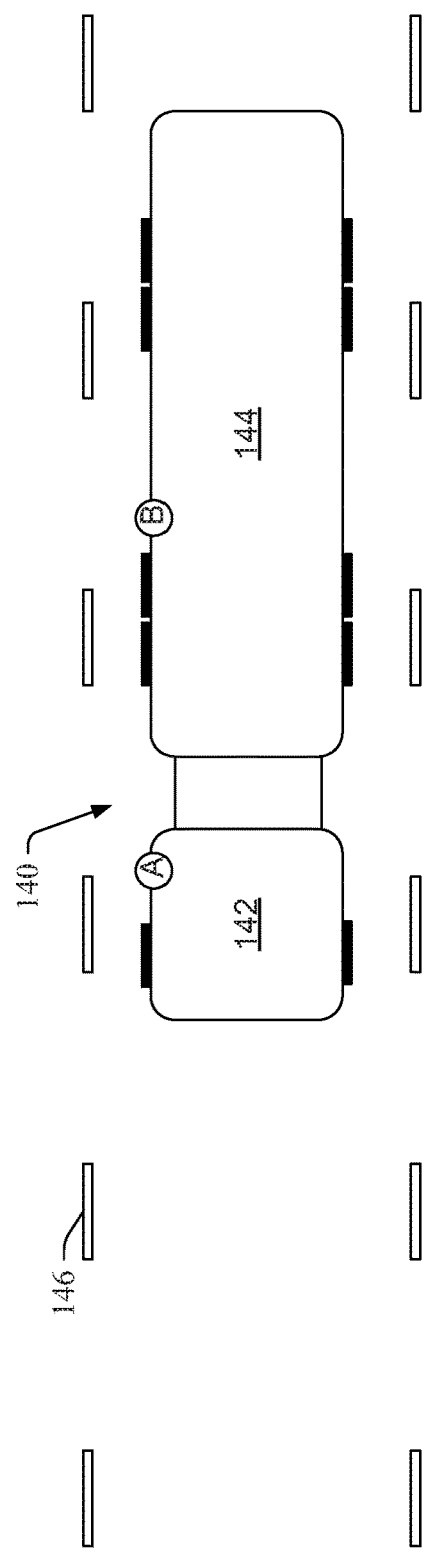
FIG. 3 illustrates an articulated vehicle comprising a tractor and a trailer, as it travels in a traffic lane marked by a plurality of dashed lane markers.

According to another example, the cameras are pre-calibrated such that a point or object location on the ground is known once it is located in the image, and its angle relative to the cameras can be determined. The average difference between the camera measurements over time is calculated to obtain the TICD laterally and longitudinally, as well as the yaw angle. For instance, with each camera looking at the same point at a time instance Camera A says it is 3, 4 and 5 meters ahead, while Camera B says it is 6, 7 and 8 meters ahead. In this example, the average difference between the measurements is 3 meters, so the cameras are offset by 3 meters from each other. FIG. 3 illustrates an articulated vehicle 140 comprising a tractor 142 and a trailer 144, as it travels in a traffic lane marked by a plurality of dashed lane markers 146. The dashed lane markers form repeating longitudinal patterns, though typically with some variations in appearance. Lane markers are typically located on the side(s) of an articulated vehicle, where they are seen by multiple cameras, and so may be used as reference objects for calculating the true inter-camera distance (TICD) between cameras. A single camera, such as camera A or camera B, can measure the length and location, relative to that camera, of the dashed lane markings. The measured dashed lane markings can be used to calculate the true inter-camera distance.

Figure 4:
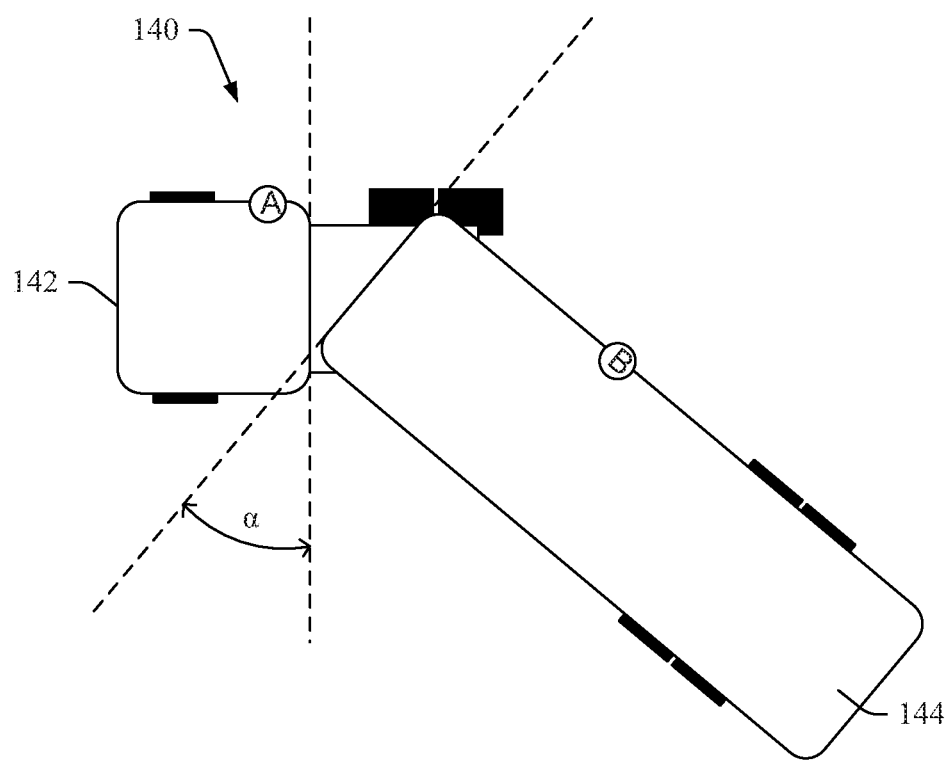
FIG. 4 illustrates the articulated vehicle, wherein the tractor and trailer are articulated relative to each other at an articulation angle α, in accordance with one or more aspects described herein.

FIG. 4 illustrates the articulated vehicle 140, wherein the tractor 142 and trailer 144 are articulated relative to each other at an articulation angle $\alpha$, in accordance with one or more aspects described herein.

In one example, it may be assumed that the cameras are moving and capturing video asynchronously. Cameras take images multiple times per second. For instance, there may be between 1/25th and 1/60th of a second between captured image frames. In the present example, a frame time of 1/25th of a second is used. To further this example, the articulated vehicle speed is 25 meters per second. A camera moving at this speed, and producing 25 images per second, thus moves 1 meter between frames. However, the cameras A and B, which are employed to generate the surround view, are not necessarily synchronized. Thus, there may be up to 1/25th of a second difference between the frame start times used produce a surround view. This 1/25th of a second corresponds to a distance uncertainty of 1 meter between the cameras.

One problem with unsynchronized cameras is that they may take a snapshot of the same object at different times. If the vehicle to which the cameras are attached is moving, then the object will move during the time gap between taking the two images, and any shift calculated will include the motion. Therefore it becomes desirable to account for the motion related term. This is done by having the vehicle move at two different speeds (i.e., at two different instances in time, as the cameras are rigidly affixed to the vehicle and therefore move at the same speed). By moving at two different speeds, e.g. once at 10 mph during vehicle acceleration, and again at e.g. 50 mph, as the vehicle travels on the highway, the amount of apparent object motion is changed.

In order to compensate for the difference uncertainty in the inter-camera distance measurement the following algorithms may be executed (e.g., by the processor of FIG. 1 or the like). The inter-camera distance may be expressed as:

$$AICD = TICD + DUFM \quad (1)$$

where AICD is the apparent inter-camera distance, TICD is the true inter-camera distance, and DUFM is the distance uncertainty from motion. The distance uncertainty from motion may be expressed as:

$$DUFM = DFST * v \quad (2)$$

where DFST is the difference in inter-camera frame start times, and where v is the speed of the vehicle. As the vehicle speed varies, the distance uncertainty from motion changes.

To further this example, a single point or object on the ground is taken as a reference, as seen by two cameras. The two image frames from the camera views are superimposed on one another using longitudinal shifting, at two different speeds. The apparent motion of the object is the vehicle speed times the difference in frame start times, DFST. This is added to the shift applied to align the object in the images taken from camera A and camera B. The equations describing the superimposition of the image frames are as follows:

$$Shift1 = TICD + speed1 * DFST \quad (3)$$

$$Shift2 = TICD + speed2 * DFST \quad (4)$$

where Shift1 is a value describing the amount by which the reference point or object in the first image is shifted, and speed1 is the speed of the first camera. Similarly, Shift2 is a value describing the amount by which the reference point or object in the second image is shifted, and speed2 is the speed of the second camera. DFST is common between the two equations. The equations (3) and (4) are then solved for TICD, the true inter-camera distance, given:

$$TICD = (speed\ ratio * shift1) - (shift2)/(speed\ ratio - 1) \quad (5)$$

where speed ratio is (speed2/speed1). In one embodiment, multiple reference points (more than one point being superimposed in two frames) are employed and averaged over time to increase the accuracy of the inter-camera distance measurement. The calculation of the distance between the cameras A and B is affected by multiple variables, including but not limited to: whether the cameras are moving; whether the cameras are capturing video synchronously or asynchronously; whether the articulated vehicle is yawing such that respective camera perspectives are affected; etc.

According to another embodiment, camera yaw differences are measured and compensated. For instance, the articulation angle(s) between the tractor and trailer(s) of a commercial vehicle are generally not zero. Therefore, the individual views produced by each camera may be rotated with respect to each other. To compensate for this rotation, an additional term is considered, given that the cameras may be yawed with respect to each other. For instance, FIG. 4 shows that camera A looks straight out to the side, but camera B looks somewhat more backward, and is yawed away from Camera A. Vehicles travelling on a straight road at higher speeds yaw only a little in their lane and/or during lane changes. Therefore, the relative rotation between the vehicle segments averages out to zero, with only small deviations from this value. The average value of the remaining rotation required to align the lane marking directions corresponds to the static yaw angle difference between two cameras. Calculating this static angle may comprise accumulating the average value of the rotation required to align the lane marking directions.

Figure 5:
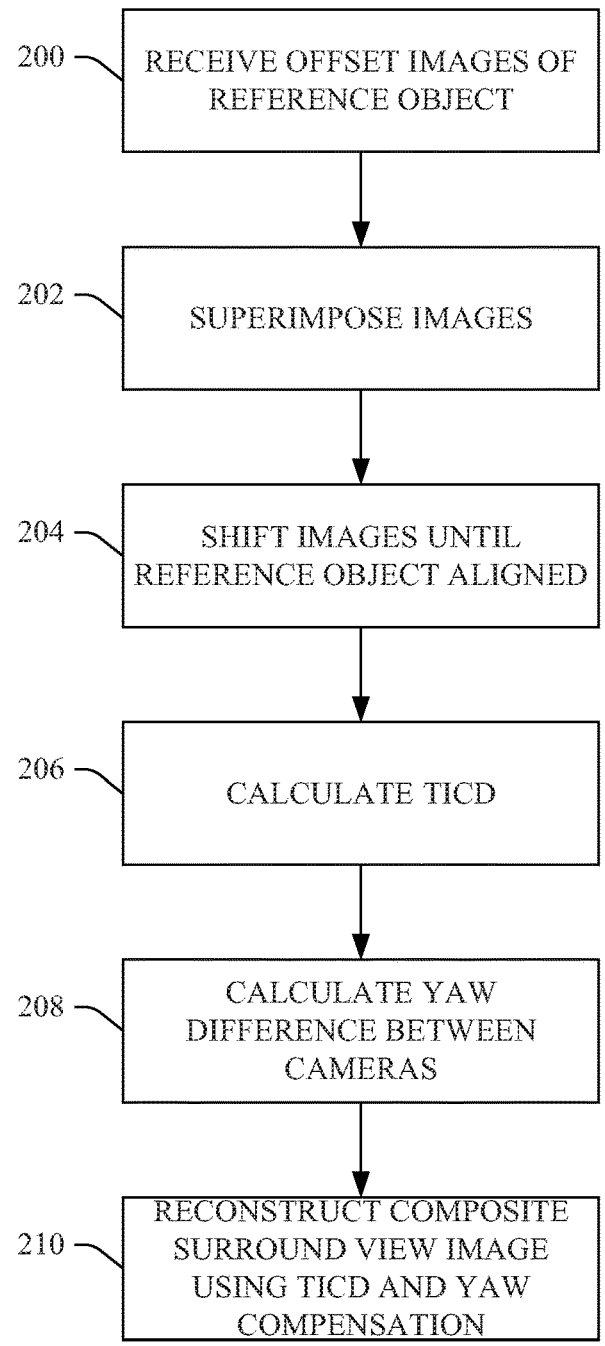
FIG. 5 illustrates a method for reconstructing a composite surround image from multiple cameras coupled to an articulating vehicle, in accordance with various features described herein.

FIG. 5 illustrates a method for reconstructing a composite surround image from multiple cameras coupled to an articulating vehicle, in accordance with various features described herein. At 200, a plurality of offset images of a reference object are received. The offset images are taken by at least two cameras having different vantage points or perspectives relative to the reference object. At 202, the offset images are superimposed or overlaid on each other. At 204, the offset images are shifted until the reference object in each image is aligned. Using the shift distance, vehicle speed, and camera frame start time information for each camera, the TICD is calculated at 206. At 208, a yaw angle between cameras is calculated and averaged over time. At 210, the composite surround view image is reconstructed using the TICD between each pair of cameras to position respective images for image stitching, and using the calculated yaw angle(s) to adjust for camera yaw.

Figure 6:
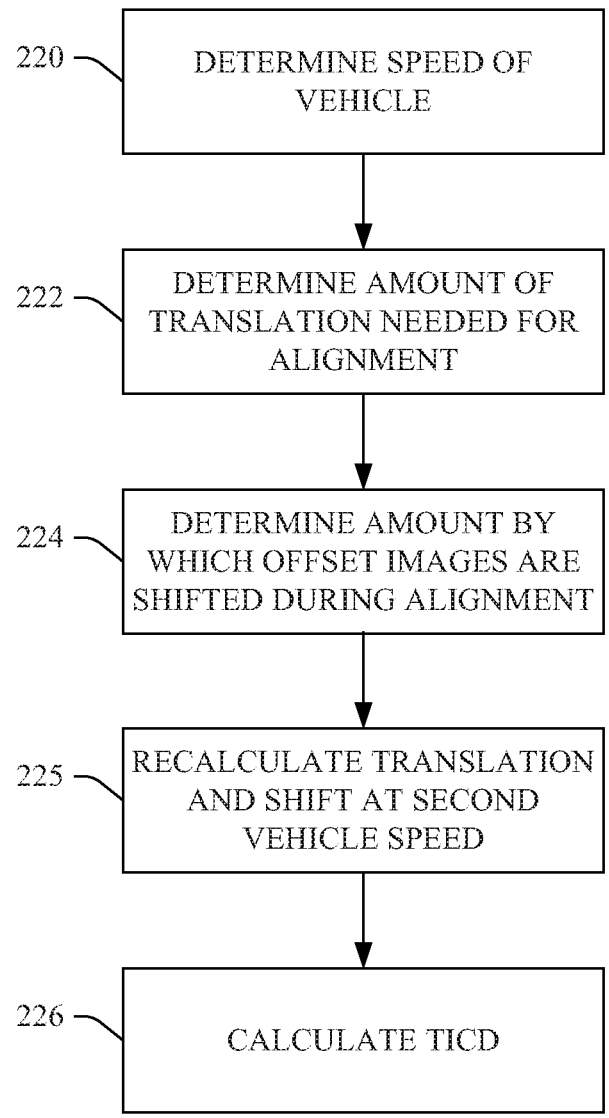
FIG. 6 illustrates a method for determining the TICD between two cameras coupled to an articulating vehicle, in accordance with one or more aspects described herein.

FIG. 6 illustrates a method for determining the TICD between two cameras coupled to an articulating vehicle, in accordance with one or more aspects described herein. At 220, the speed of the vehicle is determined. The vehicle will typically change speed during its operation, e.g. during acceleration or deceleration. At 222, the amount of marking translation required for alignment is determined. This alignment still contains an uncertainty due to potentially different frame start times. For instance, the two cameras may not capture image frames synchronously, but rather there may be a slight temporal offset between the image frames used to calculate the TICD. At 224, a shift distance used to align the reference objects in the image frames is determined. At a second time instant, when the speed has changed, the alignment required is again determined, and the above equation (5) is applied, at 225. The TICD is calculated, at 226.

Figure 7:
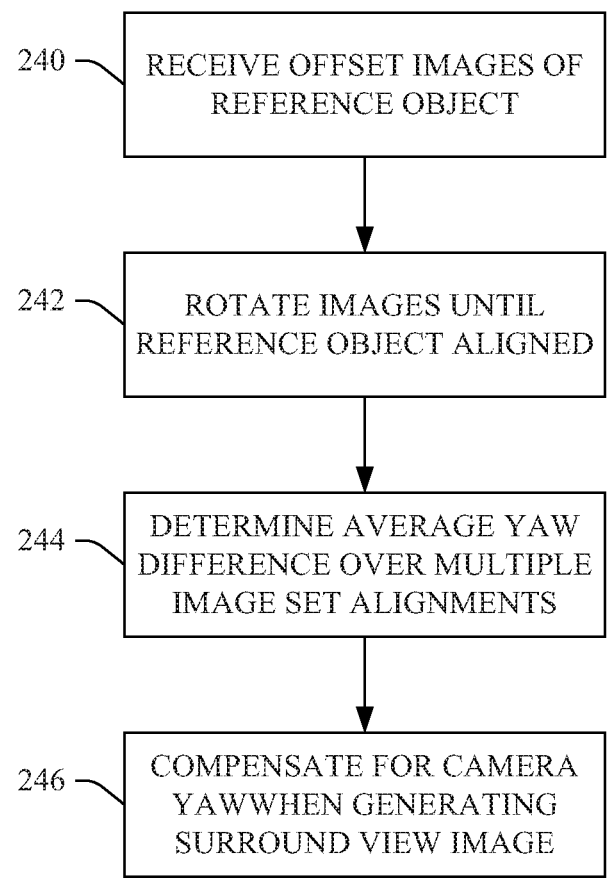
FIG. 7 illustrates a method of compensating for camera yaw angles when reconstructing a composite surround view image, in accordance with various aspects described herein.

FIG. 7 illustrates a method of compensating for camera yaw angles when reconstructing a composite surround view image, in accordance with various aspects described herein. At 240, offset images of the reference object are received or retrieved. At 242, the images are rotated until the reference object in both images is aligned. The amount of rotation required to align the reference object in a given pair of images is equal to the yaw angle between the cameras at the time of capture of the images. At 244, the yaw angle between the cameras is averaged over multiple pairs of images. At 246, a yaw compensation factor is applied when positioning images from respective cameras for stitching together during image reconstruction to generate the composite surround view image.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system that facilitates determination of the true inter-camera distance (TICD) between cameras mounted on separate portions of an articulated vehicle, comprising:
a first camera;
a second camera; and
a processor configured to:
receive from the first camera a first image frame comprising a first image of a reference object;
receive from the second camera a second image frame comprising a second image of the reference object;
overlay the first and second images thereby generating a composite image of the reference object;
shift the first and second images until they are aligned; and
calculate the TICD between the first and second cameras as a function of the distances by which first and second images are shifted during alignment, such that TICD=(speed ratio*shift1)−(shift2)/(speed ratio−1)

where shift1 is the amount by which the reference point or object in the image is shifted at a first speed, shift2 is the amount by which the reference point or object in the second image is shifted at a second speed, and speed ratio is the ratio of the second speed to the first speed.

2. The system according to claim 1, wherein the first and second cameras capture image frames asynchronously.

3. The system according to claim 2, wherein the processor is further configured to:
calculate a distance uncertainty due to vehicle motion (DUFM) as a function of vehicle speed and a frame start time difference (DFST) between respective image capture start times of the first and second cameras.

4. The system according to claim 1, wherein the first camera is mounted on a first portion of the articulated vehicle, and the second camera is mounted on a second portion of the articulated vehicle, the second portion being coupled to the first portion by an articulating coupling.

5. The system according to claim 1, further comprising a plurality of cameras, wherein the processor is configured to calculate a TICD between all permutations of pairs of cameras in the plurality of cameras and to generate a surround view that is a composite view of a plurality of images captured by the respective cameras.

6. A method of calculating a true inter-camera distance (TICD) between cameras mounted on separate portions of an articulated vehicle, comprising:

receiving from a first camera a first image frame comprising a first image of a reference object;

receiving from a second camera a second image frame comprising a second image of the reference object;

overlaying the first and second images thereby generating a composite image of the reference object;

shifting the first and second images until they are aligned; and calculating the TICD between the first and second cameras as a function of the distances by which first and second images are shifted during alignment, such that $$TICD=(\text{speed ratio}*\text{shift1})-(\text{shift2})/(\text{speed ratio}-1)$$

where shift1 is the amount by which the reference point or object in the image is shifted at a first speed, shift2 is the amount by which the reference point or object in the second image is shifted at a second speed, and speed ratio is the ratio of the second speed to the first speed.

7. The method according to claim 6, further comprising:
calculating a distance uncertainty due to vehicle motion (DUFM) as a function of vehicle speed and a frame start time difference (DFST) between respective image capture start times of the first and second cameras.

8. The method according to claim 6, wherein the first camera is mounted on a first portion of the articulated vehicle, and the second camera is mounted on a second portion of the articulated vehicle, the second portion being coupled to the first portion by an articulating coupling.

9. The method according to claim 6, further comprising calculating a TICD between all permutations of pairs of cameras in a plurality of cameras mounted on the articulating vehicle, and generating a surround view that is a composite view of a plurality of images captured by the respective cameras.

10. A non-transitory computer-readable medium having stored thereon instructions for performing the method according to claim 6.

11. A processor configured to execute computer-executable instructions for calculating a true inter-camera distance (TICD) between cameras mounted on separate portions of an articulated vehicle, the instructions comprising:

receiving from a first camera a first image frame comprising a first image of a reference object;

receiving from a second camera a second image frame comprising a second image of the reference object;

overlaying the first and second images thereby generating a composite image of the reference object;

shifting the first and second images until they are aligned; and calculating the TICD between the first and second cameras as a function of the distances by which first and second images are shifted during alignment, such that $$TICD=(\text{speed ratio}*\text{shift1})-(\text{shift2})/(\text{speed ratio}-1)$$

where shift1 is the amount by which the reference point or object in the image is shifted at a first speed, shift2 is the amount by which the reference point or object in the second image is shifted at a second speed, and speed ratio is the ratio of the second speed to the first speed.

12. The processor according to claim 11, further configured to calculate a TICD between all permutations of pairs of cameras in a plurality of cameras mounted on the articulating vehicle, and generate a surround view that is a composite view of a plurality of images captured by the respective cameras.

13. An apparatus that facilitates calculating a true inter-camera distance (TICD) between cameras mounted on separate portions of an articulated vehicle, comprising:

means for capturing a plurality of images of a reference object from at least two perspective points;

means for receiving from a first camera a first image frame comprising a first image of a reference object;

means for receiving from a second camera a second image frame comprising a second image of the reference object;

means for overlaying the first and second images thereby generating a composite image of the reference object;

means for shifting the first and second images until they are aligned; and means for calculating the TICD between the first and second cameras as a function of the distances by which first and second images are shifted during alignment, such that $$TICD=(\text{speed ratio}*\text{shift1})-(\text{shift2})/(\text{speed ratio}-1)$$

where shift1 is the amount by which the reference point or object in the image is shifted at a first speed, shift2 is the amount by which the reference point or object in the second image is shifted at a second speed, and speed ratio is the ratio of the second speed to the first speed.

* * * * *